Aug. 16, 1932.   J. LEDWINKA   1,872,149
DEVICE FOR ATTACHING MOLDING
Filed Nov. 7, 1927
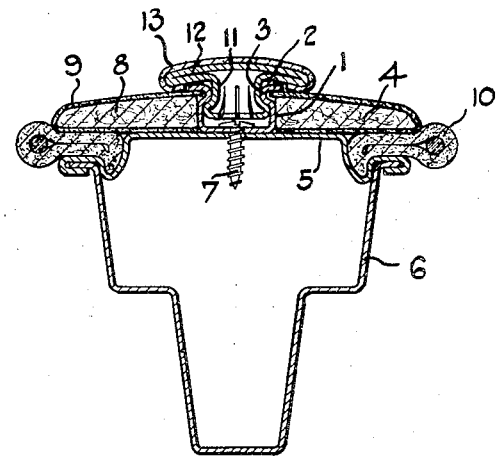
INVENTOR.
JOSEPH LEDWINKA.
BY
ATTORNEY.

Patented Aug. 16, 1932

1,872,149

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

DEVICE FOR ATTACHING MOLDING

Application filed November 7, 1927. Serial No. 231,551.

This invention relates to a fastener, being particularly directed to a fastener for securing trim pads or molding to the interior of automobile bodies, although, of course, there are many other instances wherein the fastener will be useful.

In securing moldings, trim pads or upholstery to the interior of automobile bodies, a great difficulty has been to provide securing means which is easily attached to the body and which, at the same time, is capable of being covered to blend with the general interior finish of the body and to present a neat appearance.

The chief objects of the present invention is to provide such a fastener for securing moldings, trim pads, upholstery, or similar elements to the interior of an automobile body or other places, one which permits rapid installation and one which is so formed as to be substantially unnoticeable when in position.

Other objects and advantages such as simplicity of construction, cheapness of manufacture, etc., will appear from time to time as the description progresses.

The figure of the drawing illustrates an embodiment of the invention and shows the same as used to secure a trim pad or molding upon the inner side of an automobile door post, the view being a horizontal section through the post and trim pad.

It should be stated at the outset that in actual practice the exposed surface of the fastener lies substantially flush with the upholstered surface of the molding. The relative position of the fastener to the molding has been exaggerated in the drawing for the sake of clearness and in order to show the metal portions of the fastener of heavier gauged metal than is actually used.

The fastener comprises a cup-shaped washer element 1 having flanges 2 around its rim formed by reentrantly beading the walls of the cup at 3 and then extending the flanges outwardly. The purpose of the bead 3 will become apparent as the description proceeds. This cup 1 is adapted to be set in a hole in the molding or trim pad 4 and to be secured to the inner face 5 of the post 6 by a metal drive screw 7. The flange 2 overlies the surface of the pad adjacent the opening in which the cup is positioned and thereby holds the pad in place.

As illustrated in the drawing, the bead or molding comprises a filler portion 8 and an upholstered covering 9. This upholstered covering extends up beneath the flange 2. A weather stripping or packing 10 is arranged at each edge of the pad between the same and post, being held in place in the present illustration by a portion thereof extending into the depression in the post formed when the elements thereof are clinched together.

A snap button is comprised of a member 11 formed complementally to the cup 1. This member 11 has a reentrant annular portion intermediate its outer and inner edges adapted to snap past and under the bead 3 of the cup. The snap button also has outwardly extending flanges 12 around its outer periphery which overlie the flanges 2 of the cup. Secured over the outer side of the snap button 11 is upholstery material 13 of material similar to that of 9 arranged upon the surface of the pad. The edges of this material are turned inwardly and lie between the flanges 2 and 12. The unsightly head of the drive screw 7 is thereby unostentatiously and ornamentally hidden.

It is clear that this fastener provides a quick and effective concealed fastening means for attaching the molding or upholstery to the interior of the body. It affords ready access to the drive screws 7 so that the molding may be secured to the post expeditiously. Whenever it is desired to remove the molding it is merely necessary to take out the button 11 and remove the screws 7.

In place it performs its function of securing the upholstery pad most efficiently. It does away with the necessity for special washers on drive screws.

The device is formed of a number of parts which are formed by the simplest of metal working operations and most economical manufacture.

As an article of manufacture, the fastener comprises in combination the headed drive screw 7, the cup 1 which in effect constitutes a cupped extension of the head itself and may be formed as a part of the screw or otherwise permanently connected therewith, and the concealing button 11 which is detachably engaged interiorly of the cup. As initially applied, and if desired after application, there will be sufficient clearance between the bottom of cup 1 and the bottom of the pad 4 to insure proper securing pressure of the flange 2 upon the pad.

Having described an embodiment of my invention the following claims are appended hereto with the understanding that other embodiments and adaptations may be used following the scope of such claims.

What I claim as new and useful is:

1. A fastener for securing two members together comprising a cup member having an apertured bottom, a headed fastener having its head resting within the cup and a shank extending through the aperture for securing the cup to one of the members, the side wall of the cup extending through an opening in the other member and being shaped at its edge to overlie and secure the other member, and a concealing cover for the cup overlying the open end thereof and having a portion resiliently and detachably engaging therewithin.

2. In combination with two members to be secured together, one of which is apertured and provided with a covering, a cupped member having an apertured bottom seated in said aperture and having a flange overlying the margin of the covering and member surrounding the aperture of the member, a headed fastener having a shank extending through the aperture in the cup, and into the other member for securing the cup and firstnamed member thereto, a closure for the cup having a covering similar to that of the covered member.

In testimony whereof I hereunto affix my signature.

JOSEPH LEDWINKA.